US009404804B1

(12) United States Patent
Liu et al.

(10) Patent No.: US 9,404,804 B1
(45) Date of Patent: Aug. 2, 2016

(54) THERMAL SENSOR WITH INFRARED ABSORPTION MEMBRANE INCLUDING METAMATERIAL STRUCTURE

(71) Applicant: Palo Alto Research Center Incorporated, Palo Alto, CA (US)

(72) Inventors: Victor Liu, Mountain View, CA (US); Bernard D. Casse, Saratoga, CA (US); Julie A. Bert, East Palo Alto, CA (US); Armin R. Volkel, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 14/677,419

(22) Filed: Apr. 2, 2015

(51) Int. Cl.
| | |
|---|---|
| *H01L 25/00* | (2006.01) |
| *G01J 5/00* | (2006.01) |
| *H04N 5/33* | (2006.01) |
| *G01J 5/24* | (2006.01) |
| *G01J 5/08* | (2006.01) |
| *G01J 5/02* | (2006.01) |
| *G01J 5/20* | (2006.01) |

(52) U.S. Cl.
CPC ............. *G01J 5/0014* (2013.01); *G01J 5/02* (2013.01); *G01J 5/023* (2013.01); *G01J 5/0809* (2013.01); *G01J 5/24* (2013.01); *H04N 5/33* (2013.01); *G01J 2005/0077* (2013.01); *G01J 2005/202* (2013.01)

(58) Field of Classification Search
CPC .................................... G01J 5/02; G01J 5/023
USPC .................................... 250/332, 338.1, 338.4
See application file for complete search history.

(56) References Cited

U.S. PATENT DOCUMENTS

| 2008/0049228 A1* | 2/2008 | Chan .......................... G01J 3/26 356/454 |
| 2012/0133547 A1 | 5/2012 | MacDonald et al. |

(Continued)

OTHER PUBLICATIONS

Aoyama, Takahiko et al. "Energy response of a full-energy-absorption neutron spectrometer using boron-loaded liquid scintillator BC-523", Nuclear Instruments and Methods in Physics Research A 333 (1993) 492-501, 10 pages.

(Continued)

*Primary Examiner* — David Porta
*Assistant Examiner* — Meenakshi Sahu
(74) *Attorney, Agent, or Firm* — Bever, Hoffman & Harms, LLP

(57) ABSTRACT

A thermal sensor includes an array of pixels, each having a membrane mounted on legs over a reflector, forming a Fabry-Pérot cavity. Each membrane includes an infrared (IR) absorbing material that defines multiple spaced-apart openings separated by micron-level distances that decrease thermal capacity and increase IR absorption of the membrane. Regular pitch distances between adjacent openings provides narrowband IR absorption, with pitch distances below 7.1 μm facilitating the detection of IR radiation wavelengths below 7.5 μm. Multispectral thermal imaging is achieved by arranging the pixels in repeated groups (superpixels), where each superpixel detects the same set of IR radiation wavelengths. Thermal imaging devices include thermal sensors, IR lenses and device control circuitry arranged in a camera-like manner. A methane leak detection system utilizes two multispectral imaging devices positioned to image a wellhead from two directions, and a system controller that generates spatial and spectral information describing methane plumes using the image data.

20 Claims, 7 Drawing Sheets

(56) References Cited

U.S. PATENT DOCUMENTS

| | | |
|---|---|---|
| 2012/0314541 A1 | 12/2012 | Matsuura |
| 2014/0355381 A1 | 12/2014 | Lai et al. |
| 2015/0276489 A1* | 10/2015 | Cumming ............ G01J 5/0881 250/338.3 |

OTHER PUBLICATIONS

Flaska, Marek et al., "Digital pulse shape analysis for the capture-gated liquid scintillator BC-523A", Nuclear Instruments and Methods in Physics Research A 599 (2009) 221-225, 5 pages.

Vanier, Peter E., et al., "Directional detection of fission-spectrum neutrons", 1-4244-1302-8/07, 2007 IEEE, 5 pages.

Vanier, Peter E., et al., "Calibration and Testing of a Large-Area Fast-Neutron Directional Detector", Brookhaven National Laboratory, BNL-79632-2007-CP, 8 pages.

Mascarenhas, Nicholas, et al., "Directional Neutron Detectors for Use with 14 MeV Neutrons", Sandia Report, SAND2005-6255, printed Oct. 2005, 32 pages.

Mirenda, Martin, et al., "Ionic liquids as solvents for liquid scintillation technology, Cerenkov counting with 1-Butyl-3-Methylimidazolium Chloride", Radiation Physics and Chemistry 98 (2014) 98-102, 5 pages.

Swiderski, L., et al., "Further Study of Boron-10 Loaded Liquid Scintillators for Detection of Fast and Thermal Neutrons", IEEE Transactions on Nuclear Science, vol. 57, No. 1, Feb. 2010, 6 pages.

* cited by examiner

THERMAL SENSOR WITH INFRARED ABSORPTION MEMBRANE INCLUDING METAMATERIAL STRUCTURE

FIELD OF THE INVENTION

This invention relates to thermal sensors, and more particularly to uncooled passive infrared (IR) sensor systems.

BACKGROUND OF THE INVENTION

Infrared (IR) detectors are a type of thermal sensor utilized in a variety of fields (e.g., military, scientific, security/law-enforcement, medical, industrial and automotive) to detector IR radiation. Common applications using infrared detectors include rail safety, gas leak detection, flame detection, alcohol level testing for DUI's, anesthesiology testing, petroleum exploration, space operations, temperature sensing, water and steel analysis. The two main types of infrared detectors include thermal infrared detectors and optical (photonic) detectors. Thermal infrared detectors (e.g., microbolometers, discussed further below) utilize various approaches to detect IR radiation by way of measuring the thermal effects of the incident IR radiation using various temperature dependent phenomena. To date, optical methods are recognized as the most reliable detection techniques, with unparalleled sensitivities and robust spectral discrimination. However, today's commercial multispectral imaging systems typically utilize expensive and bulky spectrometers (e.g. Fabry-Pérot mirrors, FTIR, etc.), as well as very sensitive and expensive detectors (e.g. HgCdTe (MCT)), which must be cryogenically cooled.

Microbolometers are uncooled thermal sensor devices typically used as a detector in a thermal camera to measure the power of incident IR radiation with wavelengths between 7.5-14 μm via the heating of a material with a temperature-dependent electrical resistance. Each microbolometer consisting of an array of pixels, with an exemplary generalized conventional microbolometer pixel 50 being shown in FIG. 9. Microbolometer pixel 50 is fabricated on a semiconductor (e.g., silicon) substrate 51 along with associated readout circuitry using known techniques. Legs 52 are formed/patterned on the substrate surface, and then a reflector 53 is formed/patterned between legs 52. Next, a sacrificial layer (not shown) is deposited over the substrate surface to provide a process gap, and then a layer of IR absorbing material is deposited on the sacrificial layer and selectively etched such that opposite ends of the patterned IR absorbing material layer are attached to the upper ends of legs 52. To create the final bridge-like structure shown in FIG. 9, the sacrificial layer is then removed such that the absorbing material layer forms a membrane 54 that is suspended approximately 2 μm above the upper substrate surface. Because microbolometers do not undergo any cooling, absorbing material layer must be thermally isolated from the readout circuitry, which is achieved by the bridge-like structure. During operation, IR radiation is directed (e.g., using a camera lens) onto each pixel 50 and is absorbed by membranes 54, causing a change in resistance. Reflector 53 serves to redirect light passed through the IR absorbing material to ensure the greatest possible absorption. The resistance change across each membrane 54 is measured and processed into temperatures which can be used to create an image.

Although typical microbolometers are small and light, do not require cooling, and exhibit low power consumption, they typically exhibit lower sensitivity and resolution and higher noise (i.e., in comparison with cooled thermal and photon detector imagers), and they cannot be used for multispectral or high-speed infrared applications. Moreover, as mentioned above, the practical range of IR radiation wavelengths detectable by conventional microbolometers is currently 7.5 μm to 14 μm.

There are a variety of methods to detect methane leaks, ranging from manual inspection using trained dogs to advanced satellite-based hyperspectral imaging systems. However, the primary barrier to widespread deployment is cost. To date, optical detection techniques are widely recognized as the industry gold standard in view of their ability to decisively discriminate different gas species, as well as their high detection sensitivity. Moreover, optical methods are standoff techniques and use fewer sensors. The best optical methods are multispectral/hyperspectral detection methods—these methods use very expensive cryogenically cooled detectors and spectrometers. The Holy Grail is to achieve the same detection sensitivities and robust spectral discrimination with an uncooled thermal detector, and a smaller footprint spectrometer that is ideally integrated directly on the detector.

What is needed is an uncooled passive thermal sensor that can optically (remotely) detect IR radiation more accurately than conventional uncooled passive thermal sensors (e.g., microbolometers), has essentially the same production cost as conventional microbolometers, and can detect IR radiation having wavelengths below/above) the IR radiation wavelengths detectable by conventional microbolometers.

What is also needed is an uncooled multispectral IR imaging device having a detection sensitivity equal to or greater than existing multispectral/hyperspectral detection approaches that require expensive cryogenically cooled detectors and spectrometers.

What is also needed is a low-cost, highly reliable system and method for remotely detecting and measuring gas emissions (e.g., methane leaks).

SUMMARY OF THE INVENTION

The present invention is directed to a low-cost, uncooled thermal sensor that includes an array of IR detector pixels and associated readout circuitry similar to that used by a conventional microbolometer, but differs in that the IR absorbing material membrane of each pixel is modified using metamaterials technology in a manner that greatly improves its IR absorption characteristics. Each pixel includes a membrane that is patterned from a thin layer of IR absorbing material (e.g., one or more films consisting of amorphous silicon (a-Si) or vanadium oxide) and is supported and fixedly maintained by legs at a small distance (e.g., 2 μm) over a reflector (e.g., a pad of aluminum or titanium). As in conventional microbolometer pixels, the membrane is coupled to the reflector in a manner that forms an associated Fabry-Pérot cavity that resonates when exposed to IR radiation having certain frequencies (wavelengths), and a resistance of the membrane changes in accordance with changes in the cavity's resonant state. The membrane of each pixel element is connected by way of the legs and metal traces to readout circuitry, which is configured to measure resistance changes in the membrane of each pixel using known techniques. According to an aspect of the present invention, the pixels differ from conventional microbolometer pixels in that their membranes are modified to include metamaterial structures formed by spaced-apart openings (voids) separated by micron-level distances (i.e., distances generally in the range of about 1 μm to 1 mm). The opening size (diameter) is preferably approximately one-half of the distance separating the openings, but may vary slightly without affecting performance. The present inventors determined that, by modifying the solid-type membranes of conventional microbolometer pixels to include metamaterial structures of this type, the resulting device formed an uncooled thermal sensor that exhibits significantly improved absorption of IR radiation at wavelengths similar in length to the micron-level spacing distances separating the openings. It is believed this improvement is at least in part due to the reduced thermal mass and conductance of the modified membrane that is produced by the openings, which in turn reduces the time constant (i.e., produces faster response) and increases sensitivity of pixels fabricated using the modified membrane over conventional microbolometers by at least a factor of 2.5. The present inventors also determined that these metamaterial structures are easily generated using standard semiconductor processing techniques that are easily incorporated into standard microbolometer production processes (i.e., by changing the IR absorption material layer etch mask to simultaneously form the openings in the IR absorbing membrane). Therefore, the present invention provides uncooled thermal sensors exhibiting significantly improved IR radiation absorption characteristics over conventional microbolometers at essentially the same cost as conventional microbolometers.

According to another aspect of the present invention, when the spaced-apart openings formed on the membrane of a given pixel are separated from their immediate neighboring openings by a pitch distances less than approximately 7.1 µm, the pixel exhibits absorption of IR radiation having a wavelengths of 7.5 µm and lower. For example, a pixel with a membrane having openings spaced at approximately 7.1 µm exhibited nearly 100% absorption of incident IR radiation having a wavelength of approximately 7.5 µm, and a membrane patterned with openings spaced at approximately 6.8 µm and 6.5 µm, respectively, exhibited nearly 100% absorption of incident IR radiation having corresponding wavelengths of approximately 7.25 µm and 7.0 µm, respectively. By exhibiting absorption of IR radiation having wavelengths equal to and below 7.5 µm, the present invention demonstrates a significant improvement over conventional solid-membrane microbolometers.

According to another aspect of the present invention, when all of the spaced-apart openings formed on the membrane of a given pixel are arranged in a fixed repeating pattern (i.e., such that multiple adjacent pairs of openings are separated by the same (common) pitch distance), the pixel exhibits narrowband absorption of IR radiation having a wavelength similar to the common pitch distance (i.e., the diffraction threshold wavelengths were found to be slightly greater than the pitch spacing between adjacent openings). For example, by producing a pixel with a membrane having adjacent openings spaced at a regular pitch (i.e., center-of-opening to center-of-opening) distance of approximately 7.8 µm, the pixel exhibited nearly 100% absorption of incident IR radiation having a corresponding (i.e., matching) wavelength of approximately 8.1 µm, with significant resonance drop-off for IR radiation differing by as little as 0.2 nm from the "matching" wavelength. Similarly, membranes patterned with openings having regular pitch distances of approximately 7.5 µm, 7.1 µm, 6.8 µm and 6.5 µm exhibited nearly 100% absorption of incident IR radiation having corresponding wavelengths of approximately 7.75 µm, 7.5 µm, 7.25 µm and 7.0 µm, respectively. This narrowband absorption feature provides a significant advantage over conventional microbolometers in that it facilitates the generation of uncooled multispectral thermal sensors such as those described below, that are suitable for detecting or imaging objects that emit IR radiation having multiple predictable wavelengths (e.g., such as methane leaks and other gas emissions).

According to an embodiment of the present invention, a multispectral thermal sensor includes an array of IR detector pixels formed in the manner described above, where the metamaterial structures of two or more of the pixels are configured according to the narrowband absorption feature (mentioned above) to facilitate detecting IR radiation having two or more different wavelengths. Specifically, a first pixel includes a membrane having openings spaced at a first regular pitch distance (e.g., approximately 7.8 µm), and a second pixel includes a membrane having openings spaced at a second regular pitch distance that is different from the first regular pitch distance (e.g., approximately 7.5 µm). With this arrangement, the sensor is able to separately detect incident IR radiation having two different wavelengths (i.e., approximately 8.1 µm and approximately 7.75 µm, respectively), which facilitates multispectral operations. By forming thermal sensors such that the pixels include membranes having openings disposed at different regular pitch distances, and by providing readout circuitry that is configured to individually sample the pixels, a multispectral thermal sensor is provided that can detect the presence of different IR radiation wavelengths. Because the different metamaterial structures can be generated simply by modifying the IR absorbing material layer etch mask in a microbolometer process flow to accommodate the different pitch distances, the present invention provides a method for converting conventional microbolometers into multispectral thermal sensors for essentially the same production cost.

According to another aspect of the invention, IR imaging is achieved when pixels having essentially identical IR wavelength absorption characteristics are arranged in a regular pattern. For example, if every pixel of an otherwise conventional microbolometer included an essentially identical membrane (i.e., every pixel exhibited resonance/heating in response to IR radiation having the same wavelength or range of wavelengths), then IR imaging is enabled by way of collected and assembling detection data from every pixel in the array. Moreover, according to a specific embodiment of the present invention, a multispectral imaging sensor is produced by arranging the pixels in an array of superpixels (repeated pixel groups), where each superpixel includes two or more IR detector pixels having associated membranes configured to detect associated IR radiation wavelengths, where all of the superpixels includes the same group of two or more pixels. For example, each superpixel in the array includes a first pixel including a membrane having openings spaced at a first regular pitch distance (e.g., approximately 7.8 µm), and a second pixel including a membrane having openings spaced at a second regular pitch distance that is different from the first regular pitch distance (e.g., approximately 7.5 µm). With this arrangement, when combined with suitable IR optics that focus an image onto the sensor, each superpixel of the sensor is able to detect two (or more) different IR radiation wavelengths (e.g., approximately 8.1 µm and approximately 7.75 µm, respectively) in the portion of the image directed onto that superpixel. By configuring the sensor's readout circuitry to collect and assemble resistance values from the two or more pixels of each superpixel, the present embodiment provides a multispectral thermal imaging sensor suitable for imaging objects that emit multispectral IR radiation. According to another embodiment, the present invention is directed to an imaging device including one or more of the novel thermal imaging sensors described above, a suitable optical system (e.g., an F/1 IR lens) configured to focus the IR image generated by a target object/field on the pixels of the thermal sensor, and a device controller. In one embodiment, the imaging device is constructed using a multispectral thermal imaging sensor, such as that described above, where each superpixel includes two or more pixels configured to detect two or more different IR radiation wavelengths/ranges, and in a specific embodiment the pixels are configured to detect IR radiation having wavelengths in the range of approximately 7μ to 8μ in order to detect methane gas emissions. The device controller includes image generation circuitry that processes pixel data generated by the readout circuitry of the multispectral imaging sensor and generates thermal image data corresponding to IR radiation emitted by the target object/field, and at least one of a flash memory for storing the thermal image data locally, or a modem for transmitting the thermal image data to a remote server (e.g., by way of a 4G communication system). By forming the imaging device using the novel multispectral thermal imaging sensor described above in combination with the optics and other functional components normally found on an IR camera, the present invention provides multispectral imaging device that can be utilized, for example, to remotely and passively detect gas emissions such as methane leaks. According to yet another embodiment, the present invention is directed to a passive multispectral imaging sensor system and related methodology for standoff detection of chemicals at a standoff distance (e.g., gas emissions, such as methane occurring leaks over methane gas wellheads). The system includes two or more multispectral imaging devices (described above) disposed in a space-apart manner and arranged to image a target region (e.g., the gas wellhead) from different directions, and an optional wind measuring apparatus configured to generate wind speed and wind direction data at the wellhead. A system controller (e.g., a remotely located server/processor) is configured to receive and processes the thermal image data and wind data, and generates spatial and spectral information regarding gas plumes generated over the wellhead. In one embodiment, the multispectral imaging sensors of each multispectral imaging device are configured to discriminately detect a particular chemical (e.g., methane gas) by utilizing pixels configured as described above to detect one or more IR radiation wavelengths characteristically emitted by the particular chemical (i.e., by providing each IR absorbing material membrane with openings spaced at pitch distances that produce resonance at the associated IR radiation wavelength(s)). Similar systems can be adapted to standoff detection of other chemicals, including chemical warfare agents and toxic industrial wastes.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in thermal sensors. The following description is presented to enable one of ordinary skill in the art to make and use the invention as provided in the context of a particular application and its requirements. As used herein, directional terms such as "upper", "over" "upward", "lower", "below" are intended to provide relative positions for purposes of description, and are not intended to designate an absolute frame of reference. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
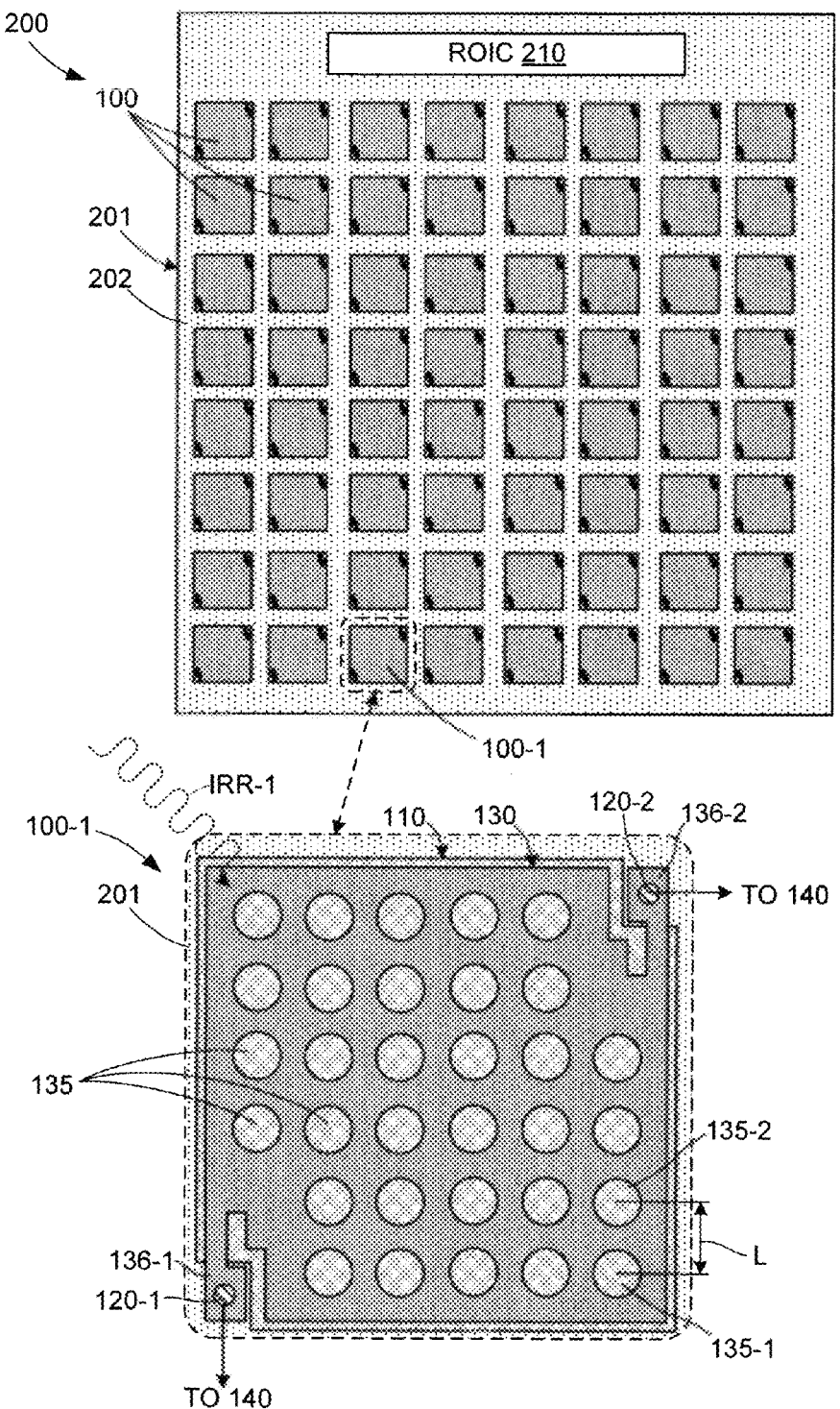
FIG. 1 is a top view showing a thermal sensor according to a generalized embodiment of the present invention.

The upper portion of FIG. 1 shows an uncooled thermal sensor 200 including an array of pixels 100 and a readout circuit (ROIC) 210 that are fabricated on upper surface 202 of a semiconductor (e.g., monocrystalline silicon) substrate 201 using conventional semiconductor fabrication processes. As indicated in the bubble at the bottom of FIG. 1, each pixel (e.g., pixel 100-1) includes a reflector 110 disposed on upper substrate surface 202, a pair of legs 120-1 and 120-2 that protrude upward from upper surface 202, and a membrane 130 having end sections 136-1 and 136-2 respectively connected to legs 120-1 and 120-2 and arranged such that membrane 130 is disposed over reflector 110. Similar to the reflectors utilized in conventional microbolometer pixels, each reflector 110 comprises a suitable IR reflective material (e.g., aluminum or titanium) that is disposed on upper substrate surface 202. Similar to the solid-plate membranes of conventional microbolometer pixels, membrane 130 comprises an infrared (IR) absorbing material (e.g., amorphous silicon (a-Si) or vanadium oxide) and is fixedly maintained on legs 120-1 and 120-2 a small distance above (i.e., separated from) reflector 110 such that coupling between membrane 130 and reflector 110 forms a Fabry-Pérot cavity that resonates at different levels when exposed to different amounts of IR radiation IRR-1, whereby the temperature of membrane 130 varies in accordance with the amount of received IR radiation IRR-1. Similar to the arrangement found on conventional microbolometers, each membrane 130 is electrically coupled by way of legs 120-1 and 120-2 and metal traces (not shown) to readout circuit 210, which is configured to measure the resistance across each membrane 130 of each pixel 100, thereby facilitating IR radiation detection by thermal sensor 200.

According to an aspect of the present invention, membrane 130 differs from the membranes of conventional microbolometer pixels in that membrane 130 is modified to include a metamaterial structure defined by multiple spaced-apart openings 135 that are defined (e.g., etched) through the IR absorbing material and are separated from each other (i.e., center-to-center) by micron-level distances (i.e., distances in the range of 600 nm (nominally 1 μm) to about 1 mm, corresponding generally to the wavelengths typically associated with IR radiation). For example, as indicated in the lower portion of FIG. 1, shows adjacent openings 135-1 and 135-2 separated by center-to-center distance L, where distance L is in the range of about fpm to about 1 mm. The present inventors found that, in comparison to the solid-membrane pixels used in conventional microbolometers, pixels 100 exhibit significantly improved absorption of IR radiation, particularly at wavelengths that are similar in length to distance L separating openings 135. Therefore, by forming thermal sensor 200 with an array of pixels 100 having membranes 130 defining spaced-apart openings 135 separated by micron-level distances L, the present invention provides a thermal sensor having better detection sensitivities than many conventional thermal sensors. Further, thermal sensor 200 has production and operating cost advantages over expensive cryogenically cooled detectors and spectrometers in that it is otherwise constructed and functions using methodologies typically provided in uncooled conventional microbolometers (i.e., thermal sensor 200 is an uncooled thermal sensor). Moreover, because openings 135 may be produced using an easily implemented modification to the semiconductor fabrication process used in the production of conventional microbolometers (i.e., by changing the IR absorption material layer etch mask to simultaneously form openings 135 in each membrane 130), and because thermal sensor 200 is otherwise implementable using elements typically provided in conventional microbolometers, uncooled thermal sensor 200 is producible with the same small footprint and at essentially the same cost as conventional microbolometers.

Figure 2:
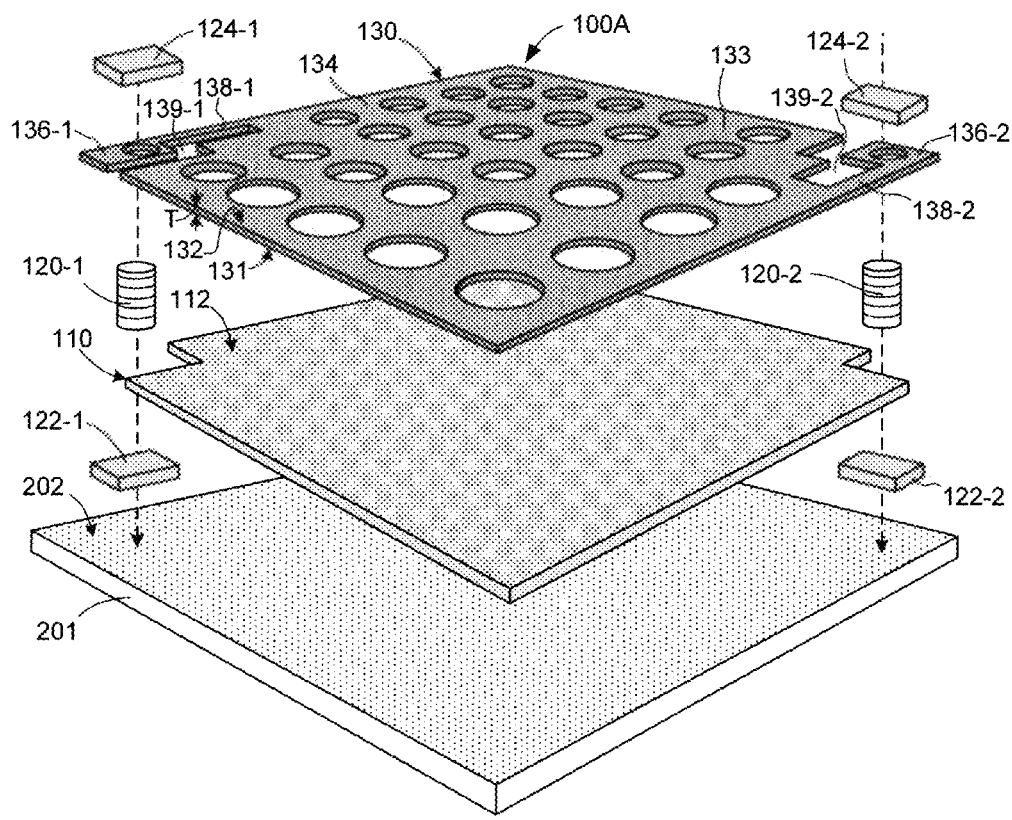
FIG. 2 is an exploded perspective view showing a pixel according to an exemplary embodiment of the present invention.
Figure 3:
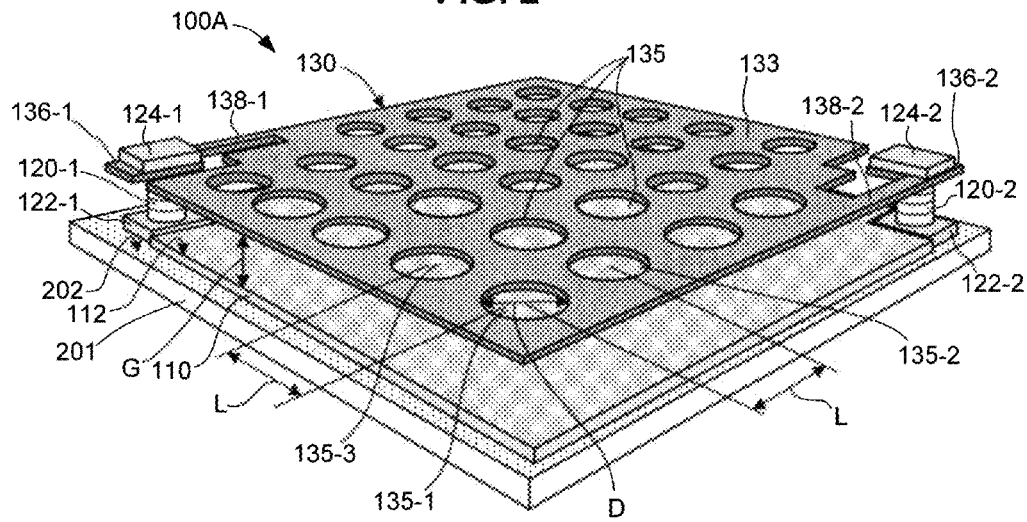
FIG. 3 is a perspective view showing the thermal sensor of FIG. 2 in an assembled state.

According to another aspect of the present invention, the detection of IR radiation having wavelengths below 7.5 μm is achieved by forming membrane 130 such that adjacent pairs of openings 135 (e.g., openings 135-1 and 135-2) are separated by distances L equal to or less than 7.1 μm. As mentioned above, the inventors found that spacing distance L between adjacent openings determines the IR radiation wavelength at which the resulting metamaterial structure resonates, and that forming openings with distances L equal to or less than 7.1 μm facilitates detecting IR radiation wavelengths below approximately 7.5 μm. By providing an uncooled thermal sensor capable of detecting IR radiation having wavelengths equal to and below 7.5 μm, the present invention demonstrates a significant improvement over conventional solid-membrane microbolometers. Moreover, by forming FIGS. 2 and 3 are exploded and perspective views showing a pixel 100A according to a specific embodiment of the present invention, and illustrate additional features and an exemplary production method. Pixel 100A includes elements and structures similar to those of pixels 100 (described above with reference to FIG. 1), and therefore utilize similar reference numbers. In an exemplary embodiment, pixel 100A is produced by forming legs 120-1 and 120-2 on upper surface 302 of substrate 201 such that legs 120-1 and 120-2 are electrically connected to corresponding traces (not shown) by way of electrodes 122-1 and 122-2, respectively, and such that legs 120-1 and 120-2 extend upward from (perpendicular to) upper surface 202. Next, a layer of reflective material is deposited/patterned on upper surface 202 to form reflector 110, and then a sacrificial layer having a predetermined thickness (e.g., 2 μm) is formed over reflector 110. An IR absorbing material (membrane) layer consisting of one or more IR absorbing material films having an aggregate thickness T in the range of approximately 50 nm and fpm is then formed over the sacrificial layer and upper ends of legs 120-1 and 120-2. A photoresist layer (not shown) is then deposited over the IR absorbing material layer and patterned to form an IR absorption material layer etch mask such that a subsequent etching process forms membrane 130 including a central region 133 defining openings 135 and end sections 136-1 and 136-2 that are connected to central region 133 by narrow arms 138-1 and 138-2, respectively. Open regions 139-1 and 139-2 that separate arms 138-1 and 138-2, respectively, from central region 133 provide thermal isolation of central region 133 from legs 122-1 and 122-2. After membrane 130 is formed, the sacrificial material disposed between reflector 110 and membrane 130 is removed using known techniques, whereby, as shown in FIG. 3, membrane 130 is supported on legs 120-1 and 120-2 and spaced from reflector 110 by a narrow air gap G (e.g., 2 μm). Optional cap structures 124-1 and 124-2 are then formed to secure membrane 130 to legs 120-1 and 120-2. Other than modifying the IR absorption material layer etch mask to facilitate simultaneously patterning the peripheral edge of membrane 130 and the formation of openings 135, the above-described production process is essentially the same as that used to generate conventional microbolometer pixels.

Referring to FIG. 3, in one embodiment all opening 135 defined on membrane 130 are arranged in an exemplary fixed repeating pattern such that multiple adjacent pairs of openings 135 are separated by a common (i.e., the same) micron-level pitch distance L. For example, opening 135-1 and opening 135-2 form a first adjacent pair aligned in a first orthogonal direction, and openings 135-1 and 135-3 form a second adjacent pair aligned in second orthogonal direction. Due to the fixed pattern, opening 135-1 is separated from adjacent opening 135-2 by pitch distance L (e.g., 7.1 μm), and opening 135-1 is also separated from adjacent opening 135-3 by the same pitch distance L (e.g., 7.1 μm). In a similar manner, each adjacent pair of openings 135 aligned in the first and second orthogonal directions is separated by common pitch distance L. By forming membrane 130 with openings arranged in a fixed pattern in this manner, the resulting metamaterial structure was found to exhibit narrowband absorption of IR radiation having a wavelength similar to the common pitch distance L (i.e., the diffraction threshold wavelengths were found to be slightly greater than the pitch spacing between adjacent openings). For example, as shown by the absorption graph of FIG. 4, by producing a pixel with a membrane having adjacent openings spaced at a regular pitch (i.e., center-of-opening to center-of-opening) distance L of approximately 7.8 μm, the pixel exhibited nearly 100% absorption of incident IR radiation having a corresponding (i.e., matching) wavelength of approximately 8.1 μm, with significant resonance drop-off for IR radiation differing by as little as 0.2 nm from the "matching" wavelength. Similarly, membranes patterned with openings having regular pitch distances L of approximately 7.5 μm, 7.1 μm, 6.8 μm and 6.5 μm exhibited nearly 100% absorption of incident IR radiation having corresponding wavelengths of approximately 7.75 μm, 7.5 μm, 7.25 μm and 7.0 μm, respectively. This narrowband absorption feature provides a significant advantage over conventional microbolometers in that it facilitates the generation of uncooled multispectral thermal sensors, such as those described below.

In order to form spaced-apart (separate) openings 135, the size of each opening 135 is necessarily smaller than distance L. According to a presently preferred embodiment of the invention, each opening 135 has a size (e.g., diameter D of opening 135-1, shown in FIG. 3) that is preferably approximately one-half of pitch distance L because pixels produced with openings of this size were found to absorb the most energy. The opening size may vary slightly from one-half of a selected pitch distance without significantly affecting performance, but energy absorption was found to diminish when the opening size varied significantly from the one-half value (i.e., when the openings were made either too large or too small).

Figure 4:
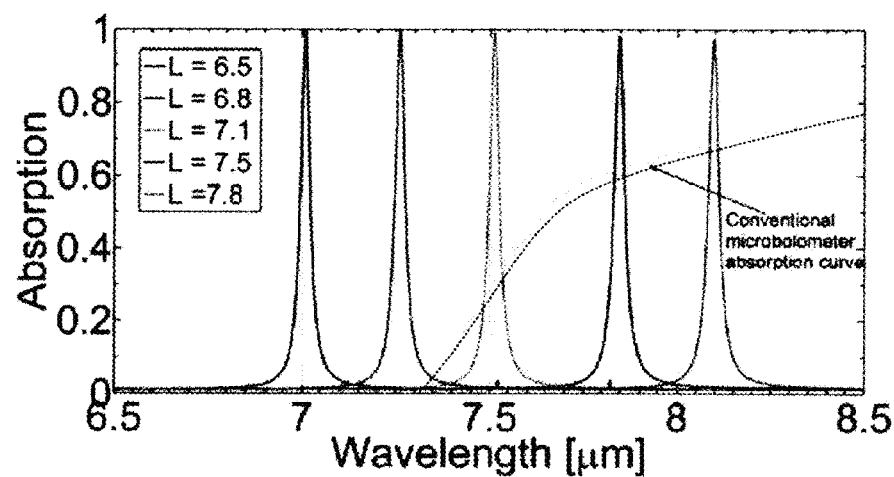
FIG. 4 is a graph showing measured absorption values for pixels having openings formed at various pitch distances.
Figure 5:
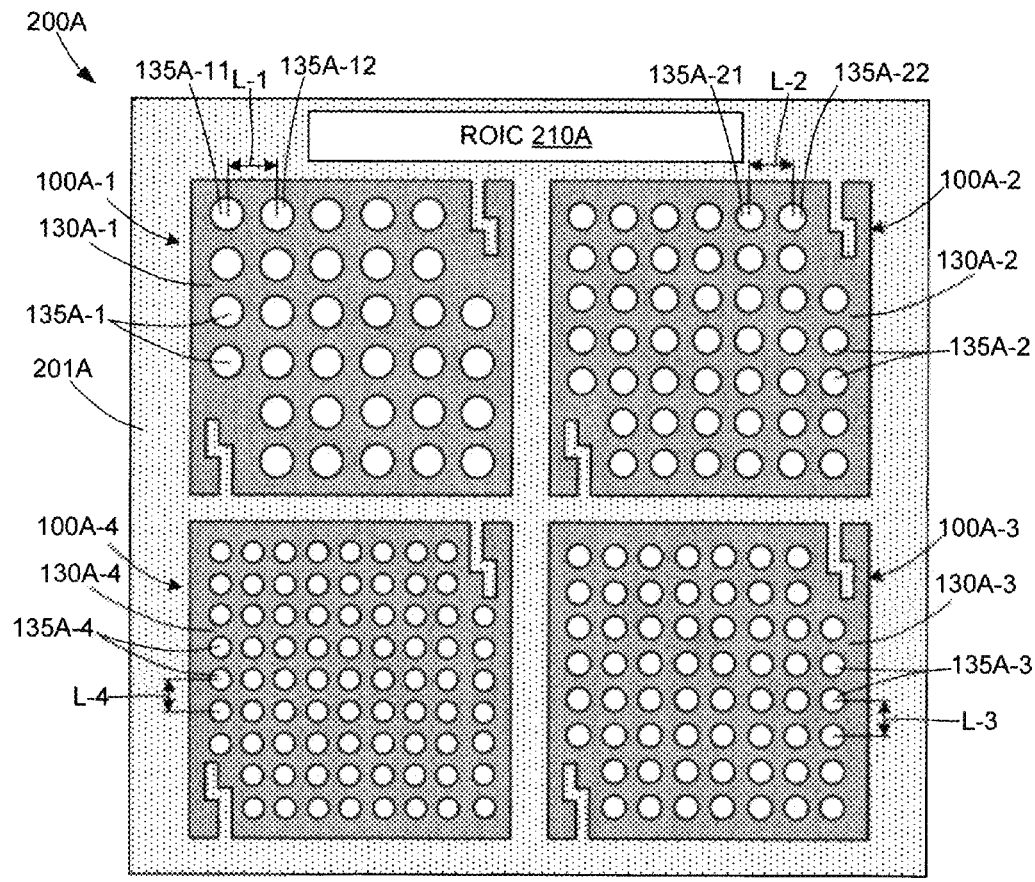
FIG. 5 is a top view showing a simplified thermal sensor according to another embodiments of the present invention.

FIG. 5 depicts a simplified multispectral thermal sensor 200A including pixels 100A-1 to 100A-4 and a readout circuit 210A formed on a substrate 201A in the manner described above, where the metamaterial structures of pixels 100A-1 and 110A-2 are configured according to the narrowband absorption feature mentioned above to facilitate detecting IR radiation having two or more different wavelengths. Specifically, pixel 100A-1 includes a membrane 130A-1 having openings 135A-1 disposed in a fixed regular pattern such that adjacent opening pairs are spaced at a (first) regular pitch distance L-1 (e.g., adjacent openings 135A-11 and 135A-12 are separated by pitch distance L-1) and second pixel 100A-2 includes a membrane 130A-2 having openings 135A-2 disposed in a fixed regular pattern such that adjacent opening pairs are spaced at a (second) regular pitch distance L-2 that is different from the first regular pitch distance L-1 (e.g., adjacent openings 135A-21 and 135A-22 are separated by pitch distance L-2). Referring to FIG. 4, by forming pixel 100A-1 with openings 135A-1 spaced at regular pitch distance L-1 of approximately 7.8 µm, pixel 100A-1 provides narrowband detection of IR radiation having a wavelength of approximately 8.1 µm. Similarly, by forming pixel 100A-2 with openings 135A-2 spaced at regular pitch distance L-2 of approximately 7.5 µm, pixel 100A-2 provides narrowband detection of IR radiation having a wavelength of approximately 7.75 µm. Further, by configuring readout circuit 210A to measure the resistances across membranes 130A-1 and 130A-2 separately, thermal sensor 200A facilitates multispectral detection of IR radiation having at least one of these two different wavelengths.

The number of different IR radiation wavelengths detectable by multispectral thermal sensor 200A is determined by the number of pixels having different fixed regular patterns. For example, multispectral thermal sensor 200A is configured to detect four different IR radiation wavelengths by including, in addition to pixels 100A-1 and 100A-2 (described above), pixels 100A-3 and 100A-4, where pixel 100A-3 includes a membrane 130A-3 defining spaced-apart openings 135A-3 arranged in a third fixed pattern in which adjacent pairs of openings 135A-3 are separated by a common (third) pitch distance L-3, and pixel 100A-4 includes a membrane 130A-4 defining spaced-apart openings 135A-4 arranged in a fourth fixed pattern in which adjacent pairs of openings 135A-4 are separated by a common fourth pitch distance L-4. By setting pitch distance L-3 to be smaller than pitch distances L-1 and L-2 (e.g., 7.1), and by setting pitch distance L-4 smaller than pitch distances L-1, L-2 and L-3 (e.g., 6.8 µm), multispectral image sensor 200A is enabled to detect and discriminate between four different IR radiation wavelengths (i.e., approximately 8.1 µm, approximately 7.75 µm, approximately 7.5 µm, and approximately 6.75 µm, respectively).

Multispectral thermal sensor 200A is illustrated in FIG. 5 as including only four pixels to simplify the relevant description, and those skilled in the art understand that typical microbolometers include many more than four pixels. By forming each of the additional pixels (not shown) of sensor 200A a unique metamaterial structure (i.e., membranes having a fixed opening pattern that differs (larger or smaller) from all other pixels), the present invention facilitates multispectral detection and discrimination of IR radiation having a large number of different wavelengths. Conversely, as described in further detail below, the pixels may be formed using a smaller number of unique metamaterial structures and arranged in an array of superpixels (pixel groups), where each superpixel including one pixel with each of the different unique metamaterial structures. In either case, because the different metamaterial structures can be generated simply by modifying the IR absorbing material layer etch mask in a microbolometer process flow to accommodate the different opening pitch distances, the present invention provides a method for converting conventional microbolometers into multispectral thermal sensors without significantly increasing production costs.

Figure 6:
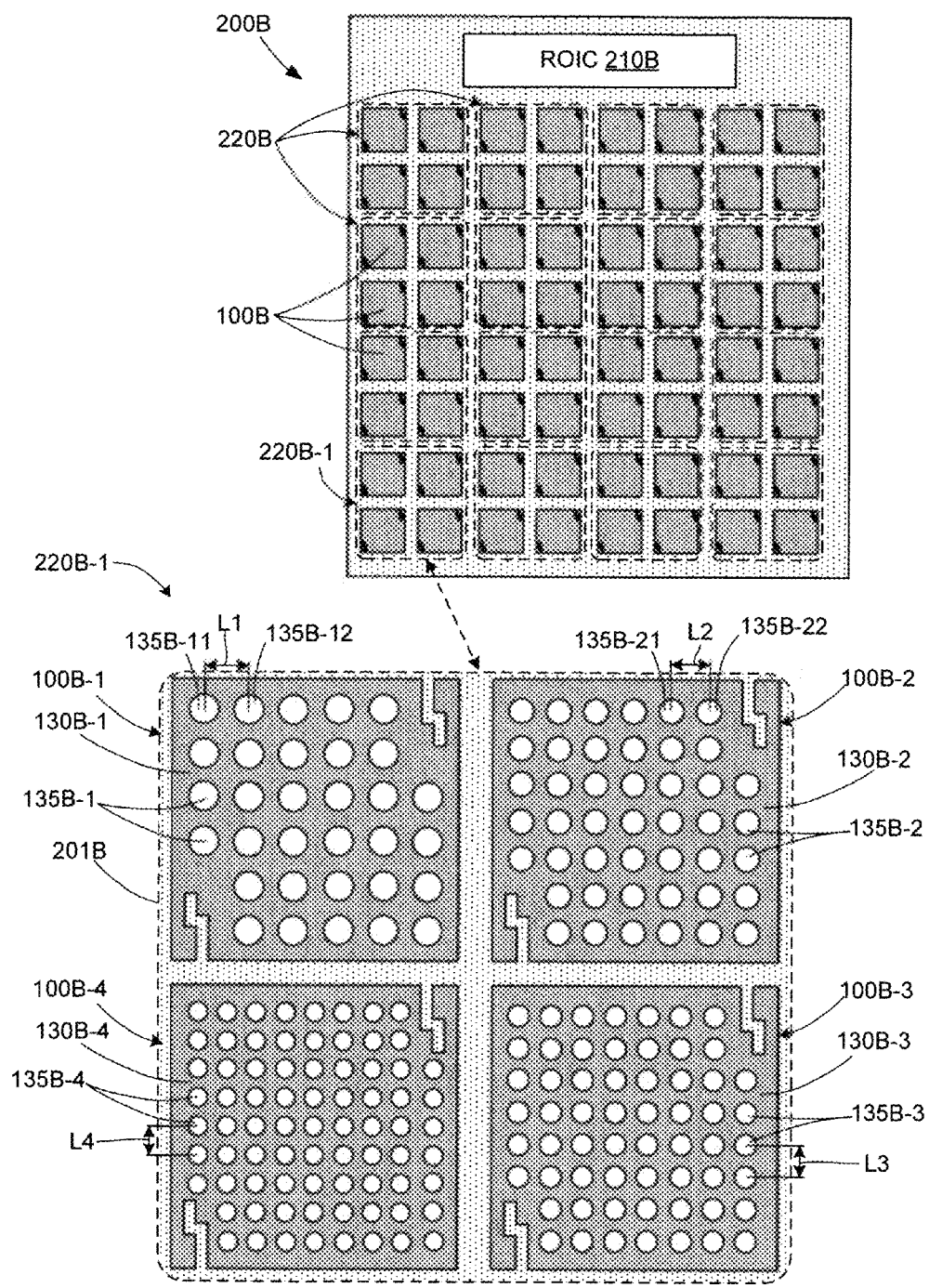
FIG. 6 is a top view showing a thermal imaging sensor according to another embodiment of the present invention.

FIG. 6 depicts a simplified multispectral thermal imaging sensor 200B that is configured to generate IR image data based on collected IR radiation emitted from a target region. Specifically, multispectral imaging sensor 200B includes pixels 100B disposed in an array of superpixels 220B, where each superpixel 220B includes a group of two or more pixels 100B configured to one pixel in each superpixel 220B is configured as described above to detect a first IR radiation wavelength, and a second pixel in each superpixel 220B is configured as described above to detect a second IR radiation wavelength. In the exemplary embodiment illustrated in FIG. 6, each superpixel 220B includes four pixels arranged in a square pattern. As indicated at the bottom of FIG. 6, superpixel 220B-1 includes pixels 100B-1 to 100B-4 having associated membranes 130B-1 to 130B-4. Similar to the example described above with reference to FIG. 6, membrane 130B-1 of pixel 100B-1 includes openings 135B-1 arranged in a first fixed pattern such that adjacent pairs of openings (e.g., openings 135B-11 and 135B-12) are separated by pitch distance L1, membrane 130B-2 of pixel 100B-2 includes openings 135B-2 arranged in a second fixed pattern such that adjacent pairs of openings (e.g., openings 135B-21 and 135B-22) are separated by pitch distance L2, membrane 130B-3 of pixel 100B-3 includes openings 135B-3 separated by pitch distance L3, and membrane 130B-4 of pixel 100B-4 includes openings 135B-4 separated by pitch distance L4. Each superpixel 220B includes four pixels having respective membranes including openings separated by pitch distances L1, L2, L3 and L4, respectively. By setting pitch distance L1 to L4 as described above (e.g., 7.8 µm, 7.5 µm, 7.1 µm and 6.8 µm) each superpixel provides a multispectral image sensor capable of detecting and discriminating between four different IR radiation wavelengths (i.e., approximately 8.1 µm, approximately 7.75 µm, approximately 7.5 µm, and approximately 6.75 µm, respectively). As set forth below, by focusing an image onto the surface of multispectral imaging sensor 200B and by configuring readout circuitry 210B to collect resistance values from each of the four pixels of each superpixel 220B, multispectral thermal imaging sensor 200B may be used to image objects that emitting IR radiation having the wavelengths detectable by the four pixels of each superpixel 220B.

Figure 7:
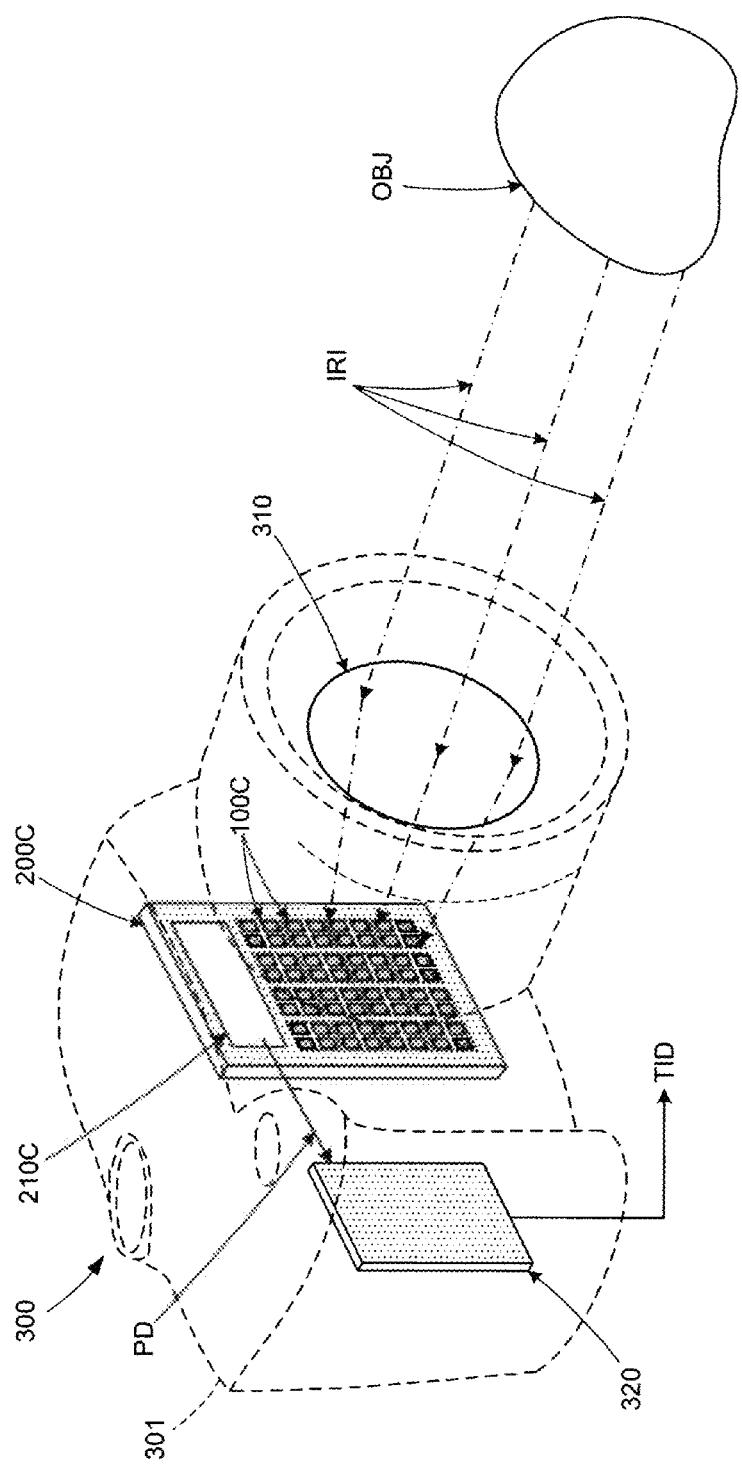
FIG. 7 is a simplified perspective view showing a thermal imaging device according to another embodiment of the present invention.

FIG. 7 depicts a simplified thermal imaging device 300 according to another exemplary embodiment of the present invention. Thermal imaging device 300 generally includes a thermal sensor 200C, an optical system 310 and a device controller 320 mounted in a suitable housing 301 (e.g., a camera housing, which is depicted using dashed lines in FIG. 7 for descriptive purposes). Thermal sensor 200C includes an array of pixels 100C and associated readout circuit 210C that are configured according to the thermal imaging sensor embodiments described above. In one embodiment, readout circuit 210C is configured to transmit pixel data PD by way of an external connection for transmission to device controller 320. Optical system 310 includes one or more suitable IR optical elements (e.g., an F/1 IR lens) that is configured using known techniques to collect IR radiation emitted from a target object OBJ (i.e., a structure or region), and to focus the IR image IRI formed by the IR radiation onto pixels 100C of sensor 200C. Device controller 320 includes image generation circuitry configured to process pixel data PD transmitted from readout circuitry 210C, and to generate thermal image data TID corresponding to IR image IRI based on pixel data PD. In one embodiment, device controller further includes at least one of a flash memory for storing the thermal image data TID and output circuitry (e.g., a modem/transmitter) that is configured to transmit thermal image data TID by way of wired or wireless transmission (e.g., by way of a 4G communication system) to a remote receiver (not shown).

In a specific embodiment, sensor 200C of imaging device 300 is optimized for detecting methane gas leaks by implementing sensor 200C using a multispectral thermal imaging sensor (such as sensor 200B described above with reference to FIG. 6) in which each superpixel includes two or more pixels configured to detect two or more different IR radiation wavelengths between approximately 7 μm and 8 μm, which corresponds with the methane absorption band.

Figure 8:
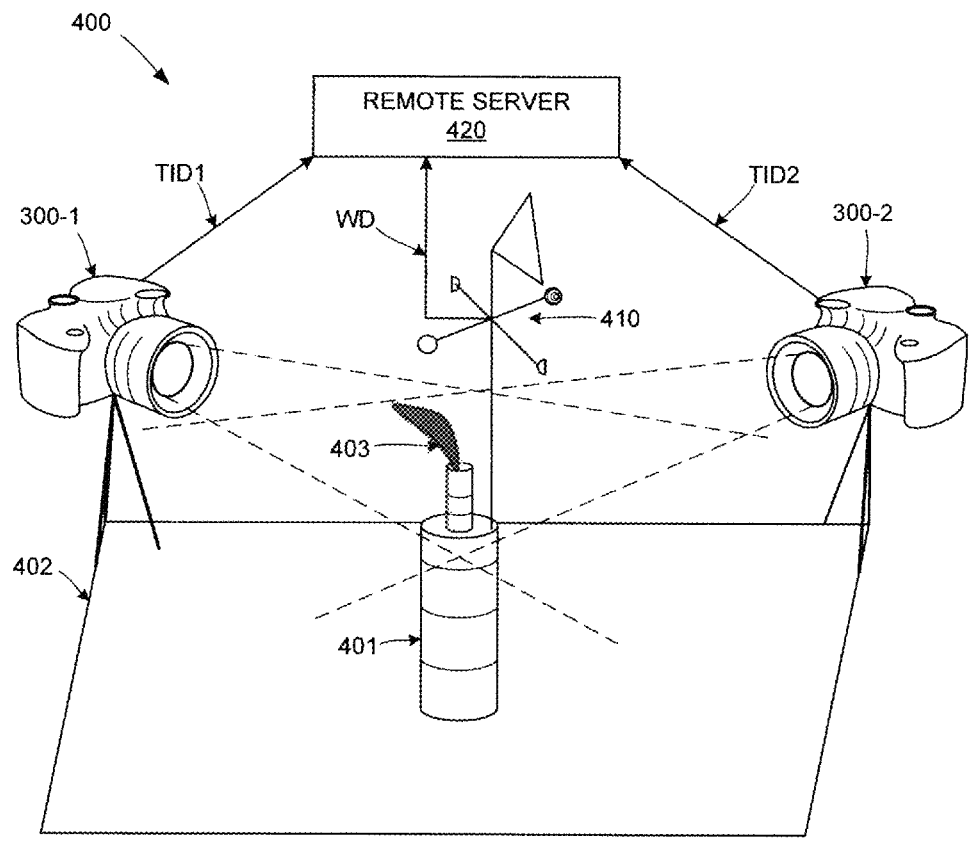
FIG. 8 is a simplified diagram showing a gas emission detection system according to another embodiment of the present invention.
Figure 9:
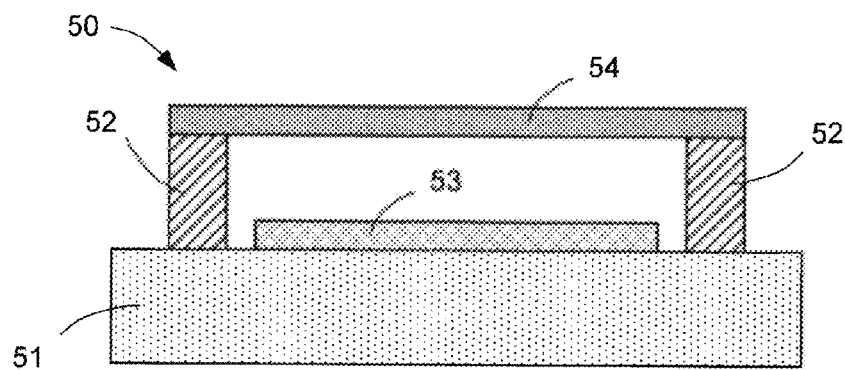
FIG. 9 is a cross-sectional side view showing a conventional microbolometer pixel.

FIG. 8 is a simplified diagram depicting an exemplary system 400 for standoff detection of a chemical (e.g., methane gas) that emits a characteristic IR radiation "signature" including one or more associated IR wavelengths that can be used to identify the chemical with a high degree of precision. System 400 includes two multispectral imaging devices 300-1 and 300-2 (which are described above) disposed in a space-apart manner and positioned at a stand-off distance (e.g., at respective corners of the typically 10 m by 10 m slab 402 on which a methane gas wellhead 401 is disposed), and arranged to image a target region (e.g., the area above wellhead 401) from different angles. An optional wind measuring apparatus 410 is disposed at the target region (e.g., mounted onto wellhead 401) and configured to provide wind speed and direction data WD that describe wind conditions at the target region. A remote server (processor) 420 420 receives and processes wind data WD transmitted from wind measuring apparatus 410 and thermal image data TID1 and TID2 respectively transmitted from devices 300-1 and 300-2, and generates spatial and spectral information INFO based on IR radiation emitted from the target region (e.g., from gas plumes 403 formed over wellhead 401). The spatial and spectral information is used to detect methane leaks. Similar systems can be adapted to standoff detection of other chemicals, including chemical warfare agents and toxic industrial wastes.

Although the present invention has been described with respect to certain specific embodiments, it will be clear to those skilled in the art that the inventive features of the present invention are applicable to other embodiments as well, all of which are intended to fall within the scope of the present invention. For example, although the present invention is described with reference to uncooled passive microbolometer-type sensors, the spectrally-selective aspect of the present invention may also be utilized in cooled microbolometers or other thermal sensors, as well as in applications involving compact spectrometers or Fabry-Pérot mirrors.

The invention claimed is:

1. A thermal sensor comprising a plurality of pixels disposed on an upper surface of a substrate, each said pixel comprising:
    a reflector disposed on the upper substrate surface;
    a pair of legs protruding from the upper substrate surface; and
    a membrane including an infrared (IR) absorbing material and mounted on the pair of legs, wherein the membrane is disposed over and separated from the reflector such that coupling between the membrane and the reflector forms a Fabry-Pérot cavity,
    wherein the membrane defines a plurality of spaced-apart openings, and
    wherein each adjacent pair of said openings is separated by a micron-level distance.

2. The thermal sensor of claim 1, wherein the IR absorbing material layer of each said pixel comprises one or more of an amorphous silicon (a-Si) film and a vanadium oxide membrane film defining said plurality of openings.

3. The thermal sensor of claim 1, further comprising a readout circuit coupled to the plurality of pixels and configured to measure resistance changes in said membrane of each said pixel.

4. The thermal sensor of claim 3, wherein said plurality of spaced-apart openings defined in the membrane of said least one of said plurality of pixels are arranged such that said adjacent pairs of said openings are separated by distances that are equal to or less than 7.1 μm.

5. The thermal sensor of claim 4, wherein all of said plurality of spaced-apart openings defined in the membrane of at least one of said plurality of pixels are arranged in a fixed pattern such that every adjacent pair of said openings is separated by a common pitch distance in the range of 6.5 μm and 7.1 μm.

6. The thermal sensor of claim 1, wherein all of said plurality of spaced-apart openings defined in the membrane of at least one of said plurality of pixels are arranged in a fixed pattern such that multiple said adjacent pairs of said openings are separated by a common micron-level pitch distance.

7. The thermal sensor of claim 6, wherein said common micron-level pitch distance is in the range of 6.5 μm and 7.8 μm.

8. The thermal sensor of claim 1, wherein said plurality of pixels comprise:
    a first pixel including a first membrane defining a plurality of spaced-apart first openings arranged in a first fixed pattern such that multiple adjacent pairs of said first openings are separated by a common first pitch distance; and
    a second pixel including a second membrane defining a plurality of spaced-apart second openings arranged in a second fixed pattern such that multiple adjacent pairs of said second openings are separated by a common second pitch distance,
    wherein said first pitch distance is larger than said second pitch distance.

9. The thermal sensor of claim 1, wherein said plurality of pixels are disposed in an array of superpixels, where each superpixel comprises:
    a first pixel including a first membrane defining a plurality of spaced-apart first openings arranged in a first fixed pattern such that multiple adjacent pairs of said first openings are separated by a common first pitch distance; and a second pixel including a second membrane defining a plurality of spaced-apart second openings arranged in a second fixed pattern such that multiple adjacent pairs of said second openings are separated by a common second pitch distance, wherein said first pitch distance is larger than said second pitch distance.

10. A thermal imaging device comprising:
a thermal sensor including:
   a plurality of pixels, each said pixel including a reflector and a membrane including an infrared (IR) absorbing material that is fixedly disposed over and separated from the reflector such that coupling between the membrane and the reflector forms a Fabry-Pérot cavity, wherein the membrane defines a plurality of spaced-apart openings that are separated by micron-level distances;
   a readout circuit coupled to the plurality of pixels and configured to measure resistance changes in said membrane of each said pixel;
an optical system configured to focus an IR image emitted from a target onto the plurality of pixels; and
a device controller including image generation circuitry configured to process pixel data generated by the readout circuitry and configured to generate thermal image data corresponding to the IR image emitted by the target.

11. The imaging device of claim 10, wherein said plurality of spaced-apart openings defined in the membranes of said plurality of pixels are arranged such that adjacent pairs of said openings are separated by distances that are equal to or less than 7.1 µm.

12. The imaging device of claim 11, wherein all of said plurality of spaced-apart openings defined in the membrane of said plurality of pixels are arranged in a fixed pattern such that every adjacent pair of said openings are separated by a common pitch distance in the range of 6.5 µm and 7.1 µm.

13. The imaging device of claim 10, wherein all of said plurality of spaced-apart openings defined in the membranes of said plurality of pixels are arranged in a fixed pattern such that multiple adjacent pairs of said openings are separated by a common pitch distance.

14. The imaging device of claim 13, wherein said common pitch distance is in the range of 6.5 µm and 7.8 µm.

15. The imaging device of claim 10, wherein said plurality of pixels are disposed in an array of superpixels, where each superpixel comprises:
   a first pixel including a first membrane defining a plurality of spaced-apart first openings arranged in a first fixed pattern such that multiple adjacent pairs of said first openings are separated by a common first pitch distance; and
   a second pixel including a second membrane defining a plurality of spaced-apart second openings arranged in a second fixed pattern such that multiple adjacent pairs of said second openings are separated by a common second pitch distance,
   wherein said first pitch distance is larger than said second pitch distance.

16. The imaging device of claim 15, wherein the first pitch distance and the second pitch distance are in the range of 6.8 µm and 7.8 µm.

17. The imaging device of claim 15, wherein each superpixel further comprises:
   a third pixel including a third membrane defining a plurality of spaced-apart third openings arranged in a third fixed pattern such that multiple adjacent pairs of said third openings are separated by a common third pitch distance; and
   a fourth pixel including a fourth membrane defining a plurality of spaced-apart fourth openings arranged in a fourth fixed pattern such that multiple adjacent pairs of said fourth openings are separated by a common fourth pitch distance,
   wherein said third pitch distance is smaller than said first and second pitch distances, and
   wherein said fourth pitch distance is smaller than said first, second and third pitch distances.

18. A system for standoff detection of a chemical that emits (IR) radiation having one or more associated wavelengths, the system comprising:
   at least one imaging device including:
      a thermal sensor including:
         a plurality of pixels, each said pixel including a reflector and a membrane comprising an infrared (IR) absorbing material that is fixedly disposed over and separated from the reflector such that coupling between the membrane and the reflector forms a Fabry-Pérot cavity, wherein the membrane defines a plurality of spaced-apart openings that are separated by micron-level distances,
         a readout circuit coupled to the plurality of pixels and configured to measure resistance changes in said membrane of each said pixel;
      an optical system configured to focus an IR image emitted from a target region onto the plurality of pixels; and
      a device controller including image generation circuitry configured to process pixel data generated by the readout circuitry and to generate thermal image data corresponding to the IR image emitted from the target region; and
   a system controller configured to receive and process the thermal image data generated by the at least one imaging device, and configured to generate spatial and spectral information regarding the chemical based on the thermal image data.

19. The system of claim 18, wherein said at least one imaging device comprises two or more multispectral thermal imaging devices disposed in a space-apart manner and arranged to image the target region) from different directions.

20. The system of claim 19, further comprising a wind measuring apparatus configured to generate wind data associated with wind speed and wind direction at the target region, wherein the system controller is further configured to generate said spatial and spectral information regarding the chemical based on the thermal image data and the wind data.

* * * * *